(12) United States Patent
Kontz

(10) Patent No.: US 9,506,224 B2
(45) Date of Patent: Nov. 29, 2016

(54) GRADE CONTROL CLEANUP PASS USING SPLINES

(71) Applicant: Caterpillar Inc., Peoria, IL (US)

(72) Inventor: Matthew E. Kontz, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/453,315

(22) Filed: Aug. 6, 2014

(65) Prior Publication Data

US 2016/0040397 A1     Feb. 11, 2016

(51) Int. Cl.
| | |
|---|---|
| G06F 19/00 | (2011.01) |
| E02F 9/26 | (2006.01) |
| E02F 9/20 | (2006.01) |
| G05B 13/04 | (2006.01) |
| G06F 17/11 | (2006.01) |
| G05D 1/02 | (2006.01) |
| E01C 19/00 | (2006.01) |

(52) U.S. Cl.
CPC .............. *E02F 9/262* (2013.01); *E01C 19/004* (2013.01); *E02F 9/205* (2013.01); *E02F 9/2045* (2013.01); *E02F 9/2054* (2013.01); *G05B 13/04* (2013.01); *G05D 1/0212* (2013.01); *G06F 17/11* (2013.01)

(58) Field of Classification Search
CPC ....... E02F 9/2004; E02F 9/26; E02F 3/3414; E02F 3/96; E02F 3/847; E02F 9/02; E02F 9/024; E02F 9/028; E02F 9/18; E02F 9/205; E02F 9/225; E02F 9/2253; E02F 9/22; E02F 9/262; E02F 9/2045; E02F 3/84; G05G 2009/0474; G05G 2009/04774; G05D 1/021; G05B 13/04; G05B 15/02; G06F 17/11

USPC ....... 701/213, 200, 50, 41, 23, 25, 301, 120; 342/357.26, 357.37, 357.52, 357.36, 342/357.34, 357.53, 357.76, 357.31; 700/284, 253; 172/179

See application file for complete search history.

(56) References Cited

U.S. PATENT DOCUMENTS

| | | | |
|---|---|---|---|
| 7,509,199 B2 * | 3/2009 | Rekow | A01B 69/004 342/357.31 |
| 8,620,535 B2 | 12/2013 | Friend et al. | |
| 9,227,474 B2 * | 1/2016 | Liu | B60D 1/245 |
| 2007/0239337 A1 * | 10/2007 | Anderson | A01B 79/005 701/50 |
| 2010/0106344 A1 * | 4/2010 | Edwards | E02F 9/205 701/2 |
| 2010/0250023 A1 | 9/2010 | Gudat | |
| 2012/0296529 A1 * | 11/2012 | Peake | A01B 69/008 701/50 |
| 2014/0012404 A1 | 1/2014 | Taylor et al. | |
| 2014/0174770 A1 | 6/2014 | Wei et al. | |
| 2014/0277899 A1 * | 9/2014 | Matsuzaki | G05D 1/0287 701/25 |

* cited by examiner

*Primary Examiner* — Muhammad Shafi
(74) *Attorney, Agent, or Firm* — Miller, Matthias & Hull LLP; L. Glenn Waterfield

(57) ABSTRACT

A computer-implemented method for determining a cleanup pass profile is provided. The method may include identifying a pass target extending from a first end to a second end along a work surface, generating a plurality of primitives between the first end and the second end such that each primitive has endpoints configured to approximate at least one of the pass target, the work surface, and an endpoint of an adjoining primitive, and adjoining the primitives at the endpoints to form a substantially continuous cleanup pass profile.

20 Claims, 5 Drawing Sheets

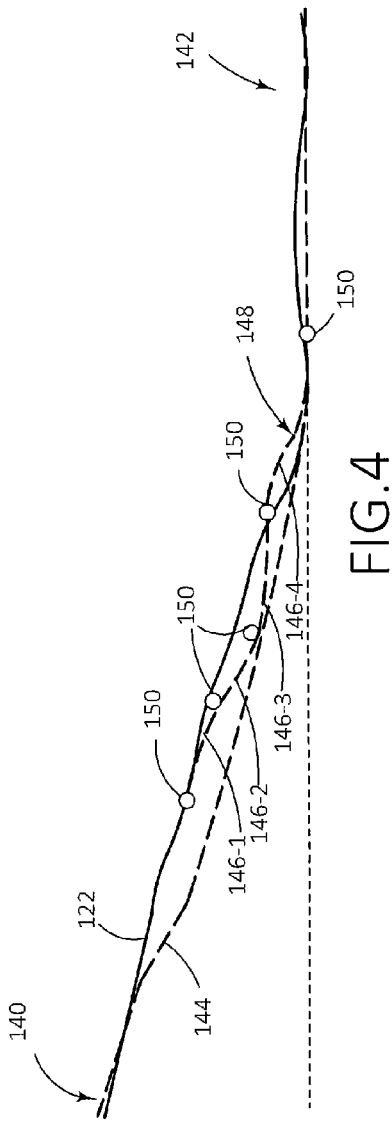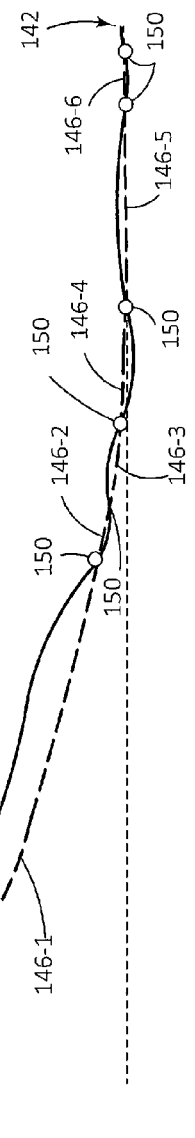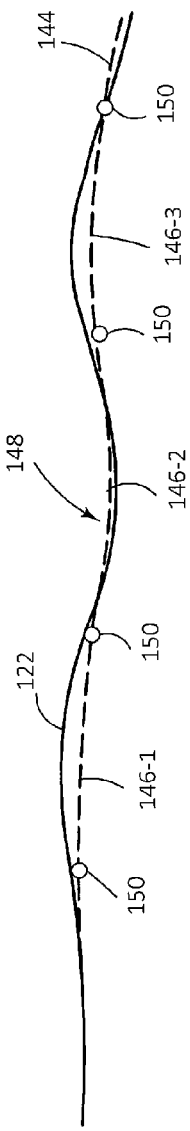

GRADE CONTROL CLEANUP PASS USING SPLINES

TECHNICAL FIELD

The present disclosure relates generally to controlling machines, and more particularly, to systems and methods for determining cleanup pass profiles for semi-autonomous and autonomous machines using splines.

BACKGROUND

Machines such as, for example, track-type tractors, dozers, motor graders, wheel loaders, and the like, are used to perform a variety of tasks. For example, these machines may be used to move material and/or alter work surfaces at a worksite. The machines may be manned machines, but may also be autonomous or semi-autonomous vehicles that perform these tasks in response to commands remotely or locally generated as part of a work plan for the machines. The machines may receive instructions in accordance with the work plan to perform operations, including digging, loosening, carrying, and any other manipulation of materials at the worksite.

It may be desirable to ensure that the machines perform these operations such that the materials are moved in an efficient manner. More particularly, in repetitive operations, it may be especially desirable to ensure that the locations at which the machines begin to alter the work surface, or the profiles along which the machines alter the work surface, are selected in a way that maximizes efficiency and productivity. Some conventional systems, such as disclosed in U.S. Pat. Appl. Publ. No. 2014/0012404, published on Jan. 9, 2014 and entitled "Methods and Systems for Machine Cut Planning," plan cut locations based on predetermined cut volume estimations. While such techniques may greatly assist in the planning processes and the overall excavation, there is still room for improvement.

A standard cut profile in autonomous dozing is generally composed of three regions, including a blade-in-air region, a blade-load region, and a blade-carry region. In the blade-in-air region, a dozer is typically reversing after a cut and positioning a blade implement to make contact with the work surface. Once contact is made with the work surface and a cut is initiated, the blade is loaded with material in the blade-load region and generally moved downward to a target carry surface. In the blade-carry region, the blade carries the loaded material to a crest of the worksite. As this process is repeated, the work surface elevation gradually changes and the profile of the blade-load region is updated accordingly. However, autonomous carry passes often adjust the blade height while in the blade-carry region which can result in unwanted deviations from the planned profile.

Theoretically, conventional cut and carry passes, along with occasional ripping passes, may be repeated to execute clean passes according to the planned profile and avoid unwanted deviations. In actual practice, however, cut and carry passes may deviate from the planned profile due to factors such as hard soil, insufficient ripping, degradations in position estimation, hump building, large rocks, boulders or other embedded obstacles, and the like. Limitations in the actual process of planning for conventional cut and carry passes are also factors. For instance, conventional processes are limited to profiles formed using S-shaped Gaussian curves, which cannot sufficiently adapt to negative volumes or valleys in the terrain that dip below the target profile, bumps in the terrain that extend above the pass target, or the like.

Accordingly, there is a need for grade control or cleanup passes that can reduce inconsistencies in the terrain, minimize operator involvement, and help improve productivity of the overall excavation. Furthermore, there is a need for cleanup pass profiling systems and methods that provide more versatile means for correcting surface irregularities, such as by shaving, snaking or otherwise cutting bumps and/or small valleys. The present disclosure is directed at addressing one or more of the inefficiencies and disadvantages set forth above. However, it should be appreciated that the solution of any particular problem is not a limitation on the scope of this disclosure or of the attached claims except to the extent express noted.

SUMMARY OF THE DISCLOSURE

In one aspect of the present disclosure, a computer-implemented method for determining a cleanup pass profile is provided. The method may include identifying a pass target extending from a first end to a second end along a work surface, generating a plurality of primitives between the first end and the second end such that each primitive has endpoints configured to approximate at least one of the pass target, the work surface, and an endpoint of an adjoining primitive, and adjoining the primitives at the endpoints to form a substantially continuous cleanup pass profile.

In another aspect of the present disclosure, a control system for determining a cleanup pass profile is provided. The control system may include a memory configured to retrievably store one or more algorithms, and a controller in communication with the memory. The controller, based on the one or more algorithms, may be configured to at least identify a pass target extending from a first end to a second end along a work surface, generate a plurality of primitives between the first end and the second end such that each primitive has endpoints configured to approximate at least one of the pass target, the work surface, and an endpoint of an adjoining primitive, and adjoin the primitives at the endpoints to form a substantially continuous cleanup pass profile.

In yet another aspect of the present disclosure, a controller for determining a cleanup pass profile is provided. The controller may include a pass target identification module configured to identify a pass target extending from a first end to a second end along a work surface, a primitive generation module configured to generate a plurality of primitives between the first end and the second end such that each primitive has endpoints configured to approximate at least one of the pass target, the work surface, and an endpoint of an adjoining primitive, and a cleanup pass profile module configured to adjoin the primitives at the endpoints to form a substantially continuous cleanup pass profile.

BRIEF DESCRIPTION OF THE DRAWINGS

FIG. 4 is a diagrammatic illustration of an exemplary cleanup pass profile that may be generated by a control system of the present disclosure using splines and primitives defined by curves;

FIG. 5 is a diagrammatic illustration of an exemplary cleanup pass profile that may be generated by a control system of the present disclosure using splines and primitives defined by nodes and volume differentials;

FIG. 6 is a diagrammatic illustration of an exemplary cleanup pass profile that may be generated by a control system of the present disclosure using splines and primitives defined by nodes and curvature inflection points;

DETAILED DESCRIPTION

Although the following sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term is expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

Figure 1:
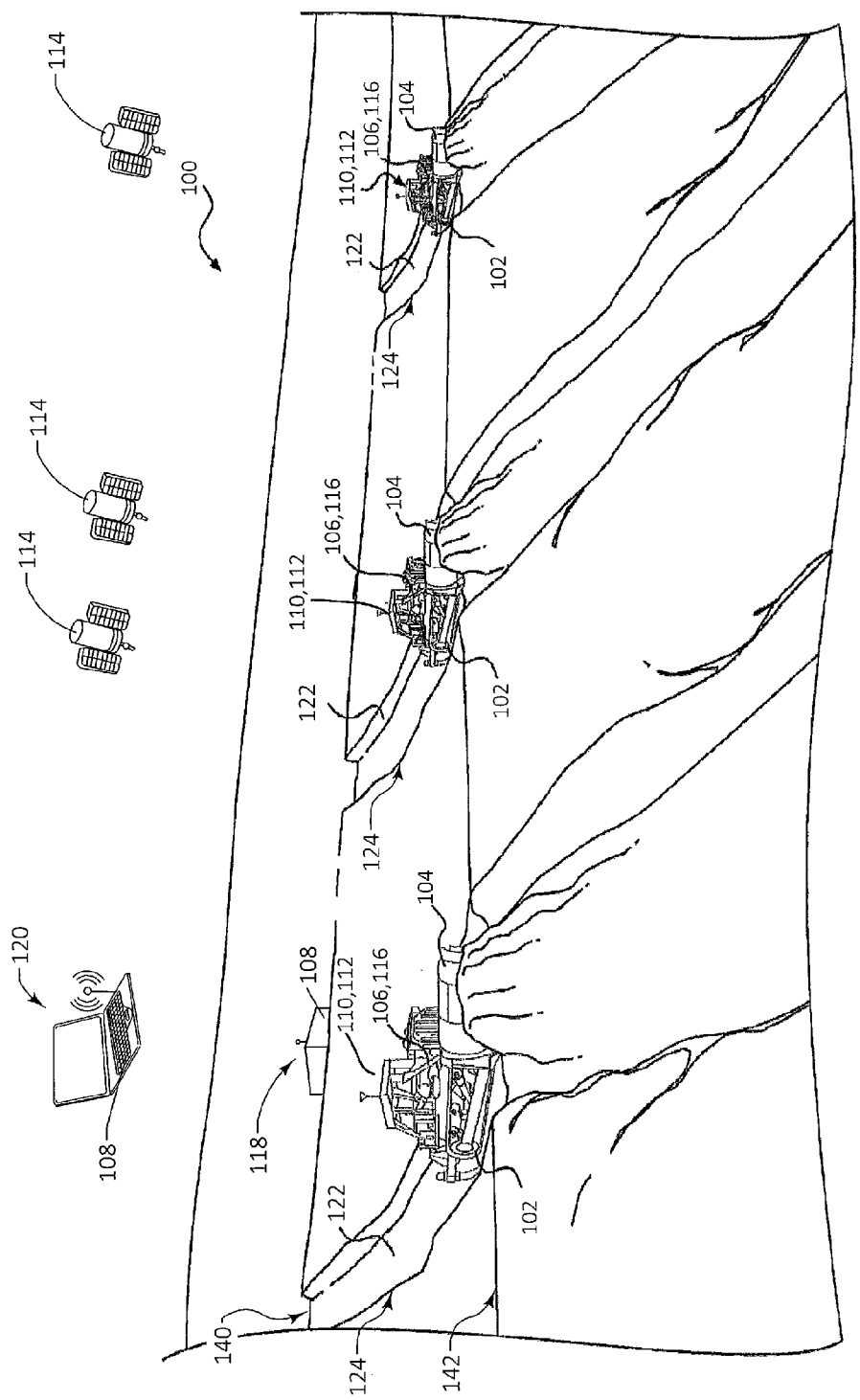
FIG. 1 is a pictorial illustration of an exemplary disclosed worksite.

Referring now to FIG. 1, one exemplary worksite 100 is illustrated with one or more machines 102 performing predetermined tasks. The worksite 100 may include, for example, a mine site, a landfill, a quarry, a construction site, or any other type of worksite. The predetermined task may be associated with altering the geography at the worksite 100, such as a dozing operation, a grading operation, a leveling operation, a bulk material removal operation, or any other type of operation that results in geographical modifications within the worksite 100. The machines 102 may be mobile machines configured to perform operations associated with industries related to mining, construction, farming, or any other industry known in the art. The machines 102 depicted in FIG. 1, for example, may embody earth moving machines, such as dozers having blades or other work tools or implements 104 movable by way of one or more actuators 106. The machines 102 may also include manned machines or any type of autonomous or semi-autonomous machines.

The overall operations of the machines 102 and the machine implements 104 within the worksite 100 may be managed by a control system 108 that is at least partially in communication with the machines 102. Moreover, each of the machines 102 may include any one or more of a variety of feedback devices 110 capable of signaling, tracking, monitoring, or otherwise communicating relevant machine information to the control system 108. For example, each machine 102 may include a locating device 112 configured to communicate with one or more satellites 114, which in turn, may communicate to the control system 108 various information pertaining to the position and/or orientation of the machines 102 relative to the worksite 100. Each machine 102 may additionally include one or more implement sensors 116 configured to track and communicate position and/or orientation information of the implements 104 to the control system 108.

The control system 108 may be implemented in any number of different arrangements. For example, the control system 108 may be at least partially implemented at a command center 118 situated locally or remotely relative to the worksite 100 with sufficient means for communicating with the machines 102, for example, via satellites 114, or the like. Additionally or alternatively, the control system 108 may be implemented using one or more computing devices 120 with means for communicating with one or more of the machines 102 or one or more command centers 118 that may be locally and/or remotely situated relative to the worksite 100. In still further alternatives, the control system 108 may be implemented on-board any one or more of the machines 102 that are also provided within the worksite 100. Other suitable modes of implementing the control system 108 are possible and will be understood by those of ordinary skill in the art.

Using any of the foregoing arrangements, the control system 108 may generally be configured to monitor the positions of the machines 102 and/or machine implements 104 relative to the worksite 100 and a predetermined target operation, and provide instructions for controlling the machines 102 and/or machine implements 104 in an efficient manner in executing the target operation. In certain embodiments, the machines 102 may be configured to excavate areas of a worksite 100 according to one or more predefined excavation plans. The excavation plans can include, among other things, determining the location, size, and shape of a plurality of cuts into an intended work surface 122 at the worksite 100 along one or more slots 124. In such embodiments, the control system 108 may be used to plan not only the overall excavation, but also to plan intermittent grade control or cleanup passes within the slots 124 or any other areas of the work surface 122. For a given work surface 122 and pass target, for instance, the control system 108 may generate a cleanup pass profile best suited to remove surface irregularities, such as smaller bumps and valleys in the work surface 122, which may adversely affect the autonomous or semi-autonomous performance of the overall excavation. Although described in connection with grade control or cleanup pass planning and profiling, the control system 108 may similarly be employed in conjunction with other types of tasks.

Figure 2:
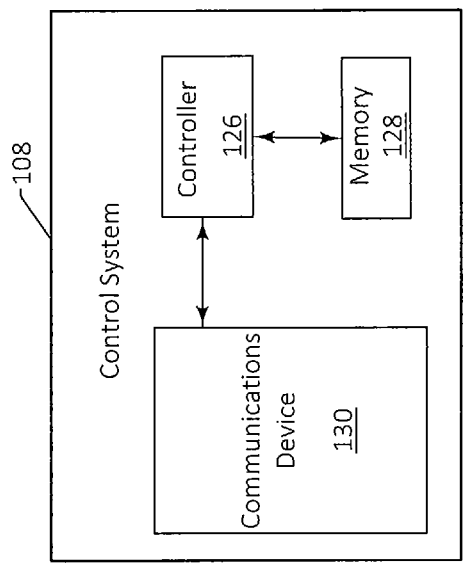
FIG. 2 is a diagrammatic illustration of an exemplary control system that may be used at a worksite.

Turning to FIG. 2, one exemplary embodiment of a control system 108 that may be used in conjunction with the worksite 100 and the machines 102 of FIG. 1 is diagrammatically provided. As shown, the control system 108 may generally include, among other things, a controller 126, a memory 128, and a communications device 130. More specifically, the controller 126 may be configured to operate according to one or more algorithms that are retrievably stored within the memory 128. The memory 128 may be provided on-board relative to the controller 126, external to the controller 126, or otherwise in communication therewith. The communications device 130 may be configured to enable the controller 126 to communicate with one or more of the machines 102, and receive information pertaining to the position and/or orientation of the machines 102 and the machine implements 104, for example, via satellites 114, or any other suitable means of communication. Moreover, the controller 126 may be implemented using any one or more of a processor, a microprocessor, a microcontroller, or any other suitable means for executing instructions stored within the memory 128. Additionally, the memory 128 may include non-transitory computer-readable medium or memory, such as a disc drive, flash drive, optical memory, read-only memory (ROM), or the like.

Figure 3:
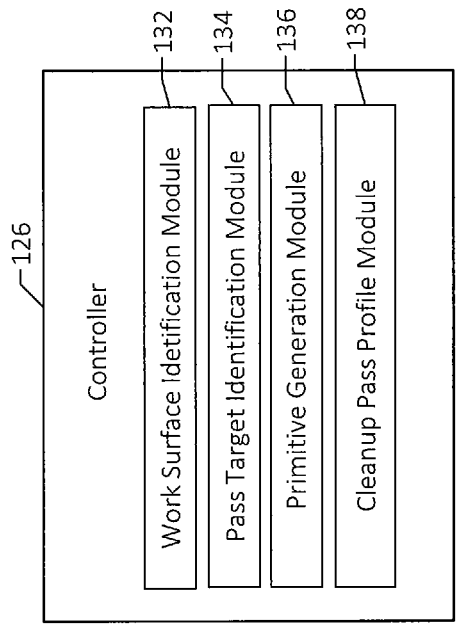
FIG. 3 is a diagrammatic illustration of an exemplary controller that may be used at a worksite.

As further shown in FIG. 3, the controller 126 may be configured to at least determine a grade control or cleanup pass profile at a worksite 100 according to one or more preprogrammed algorithms which may be generally categorized into, for example, a work surface identification module 132, a pass target identification module 134, a primitive generation module 136, and a cleanup pass profile module 138. With further reference to the exemplary diagram of FIG. 4, the work surface identification module 132 may configure the controller 126 to initially identify the work surface 122 to be worked on, such as in terms of position relative to the worksite 100, position relative to the machines 102, elevation, slope, volume of material moved, removed or remaining, terrain composition, or any other relevant geographical profile. As shown for example in FIG. 4, a given work surface 122 may generally be defined as the section of terrain along a slot 124 extending between an alignment gap 140 at a first end and a crest 142 at the second end. Information pertaining to the work surface 122 and/or changes thereto may be communicated to the controller 126 via manual entries, preprogrammed entries, periodically updated entries, real-time entries, or any combination thereof. Moreover, the work surface identification module 132 may configure the controller 126 to map the work surface 122 in two-dimensional formats, such as shown in FIG. 4, or in other alternatives, in three-dimensional formats.

The pass target identification module 134 of FIG. 3 may configure the controller 126 to identify the carry surface or pass target 144 that is ultimately desired. As with the work surface identification module 132, the pass target identification module 134 may identify the pass target in terms of location or position relative to the worksite 100, position relative to the machines 102, position relative to the work surface 122, elevation, slope, volume differential with the work surface 122, terrain composition, or any other relevant geographical profile. Additionally, the pass target 144 may generally extend the length of the work surface 122 between the alignment gap 140 and the crest 142. The pass target 144 may be identified using any number of different techniques. As shown for instance in FIG. 4, the pass target 144 may be identified or defined based on a two-dimensional user-defined curve that is positioned, superimposed or otherwise mapped relative to the work surface 122. Moreover, information defining the pass target 144 may be manually input, programmed or preprogrammed into the controller 126. In other alternative embodiments, the pass target 144 may be identified based on a two-dimensional cross-section or slice of a three-dimensional model of the pass target 144. In still further modifications, the controller 126 may be configured to identify the work surface 122 and the pass target 144 using three-dimensional models, or the like.

In addition, the primitive generation module 136 of FIG. 3 may configure the controller 126 to generate a plurality of primitive curves or primitives 146 that can ultimately be combined or adjoined at its endpoints to construct a spline to be used as the grade control or cleanup pass profile 148 for the given work surface 122 and pass target 144. More particularly, each primitive 146 may be a curve that is defined by a line, a parabola, a cubic, a polynomial, a Gaussian curve, an exponential function, or the like. In the embodiment of FIG. 4, for example, four primitives 146 may be provided along the work surface 122 generally extending from the alignment gap 140 toward the crest 142. Each primitive 146 may be configured in a way which defines cuts or fills in the work surface 122 that best approximates the cleanup pass profile 148. Furthermore, each primitive 146 may be further defined or constrained based on slope, elevation and/or any other derivative thereof, so as to provide a substantially smooth and continuous cleanup pass profile 148. Specifically, the endpoint of each primitive 146 may be constrained to the slope and elevation of an adjoining primitive 146, a corresponding segment of the work surface 122, or a corresponding segment of the pass target 144. For example, the elevation or curve function of a given primitive 148 may be provided as $$y(x) = c_0 + c_1 x + \ldots + c_{m_k} x^{m_k} \quad (1)$$

and the slope or derivative of that function may be provided as $$\frac{\partial y}{\partial x} = c_1 + 2c_2 x + \ldots + m_k c_{m_k} x^{m_k - 1} \quad (2)$$

where m denotes the order of the polynomial making up the kth primitive, and c denotes the unknown polynomial coefficients to be resolved. Using mathematical relationships between a sufficient set of functions or constraints, such as those of equations (1) and (2), the polynomial coefficients that define each primitive 146 may be determined. For instance, in a pass with n number of primitives 146, solving a set of 2(n−1) equations may provide coefficients that will match the slope and elevation at the endpoints of adjoining primitives 146, and solving a set of four equations may provide coefficients that will match the slope and elevation at the relevant endpoints of the first and final primitives 146 to the work surface 122 or the pass target 144.

Accordingly, as shown for example in the embodiment of FIG. 4, each primitive 146 may be formed of a curve defined by a polynomial function that is constrained at its endpoints in terms of slope and elevation. In particular, the slope and elevation of the endpoints of the first primitive 146-1 may be configured to match those of the work surface 122 adjacent thereto and the second primitive 146-2. Correspondingly, the slope and elevation of the endpoints of the second primitive 146-2 may be configured to match those of the first primitive 146-1 and the third primitive 146-3, while the slope and elevation of the endpoints of the third primitive 146-3 may be configured to match those of the second primitive 146-2 and the fourth primitive 146-4. The slope and elevation of the endpoints of the fourth primitive 146-4 may be configured to match those of the third primitive 146-3 and the crest 142 of the work surface 122 adjacent thereto. Optionally, in some applications, the slope and/or elevation of the final endpoint of the fourth primitive 146-4, or any other primitive 146 nearest the crest 142, may be unconstrained and left to float. Furthermore, the polynomial functions corresponding to the curves of any one or more of the primitives 146 may be modified as needed while maintaining any of the constraints previously applied.

In other modifications, the primitive generation module 136 may configure the controller 126 to generate primitives 146 based on nodes 150 rather than solely based on individual curve functions. As shown in FIG. 5, for example, the primitives 146 may be defined by nodes 150 which segment the pass target 144 according to the position of the work surface 122 relative thereto. Specifically, the nodes 150 may be positioned where the work surface 122 and the pass target 144 intersect, and thereby segment the pass target 144 based on a volume differential between the work surface 122 and the pass target 144. For instance, the nodes 150 may segment the pass target 144 into one of either a cut region corresponding to a positive volume differential or a fill region corresponding to a negative volume differential. In FIG. 5, for example, the nodes 150 generally define six primitives 146 of which the first primitive 146-1, the third primitive 146-3 and the fifth primitive 146-5 are cut regions, or regions where the work surface 122 forms bumps relative to the pass target 144. Correspondingly, the second primitive 146-2, the fourth primitive 146-4 and the sixth primitive 146-6 are fill regions, or regions where the work surface 122 forms valleys relative to the pass target 144.

In addition, the nodes 150 may also be positioned to correspond to curvature inflection points of the work surface 122, or where the curvature changes in concavity relative to the work surface 122. As shown in FIG. 6, for example, four nodes 150 are positioned proximate to the work surface 122 in a manner which segments the work surface 122 into three general regions and forms three corresponding primitives 146 therealong. More specifically, each of the first primitive 146-1 and the third primitive 146-3 corresponds to a region of the work surface 122 having positive concavity, while the second primitive 146-2 corresponds to a region of the work surface 122 having negative concavity. Whether the nodes 150 are defined based on volume differentials, curvature inflections, or the like, any one or more of the primitives 146 or curve functions defined by the nodes 150 may be further modified as discussed with respect to the embodiment of FIG. 4. Conversely, primitives 146 already defined according to polynomial functions, or the like, as in the embodiment of FIG. 4 may further be modified by adding nodes 150 thereto.

Figure 7:
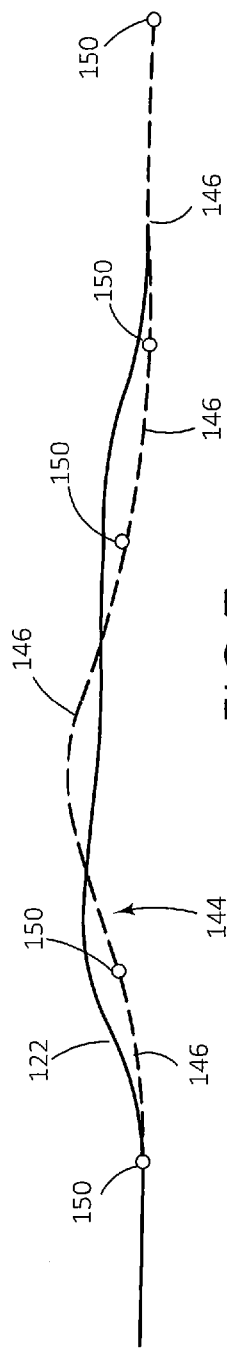
FIG. 7 is a diagrammatic illustration of another exemplary cleanup pass profile that may be generated using splines and primitives defined by nodes and curvature inflection points.
Figure 8:
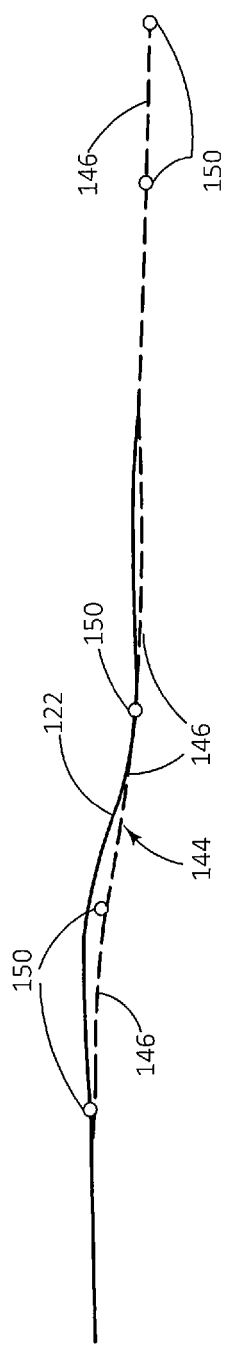
FIG. 8 is a diagrammatic illustration of another exemplary cleanup pass profile that may be generated using splines and primitives defined by nodes and curvature inflection points.
Figure 9:
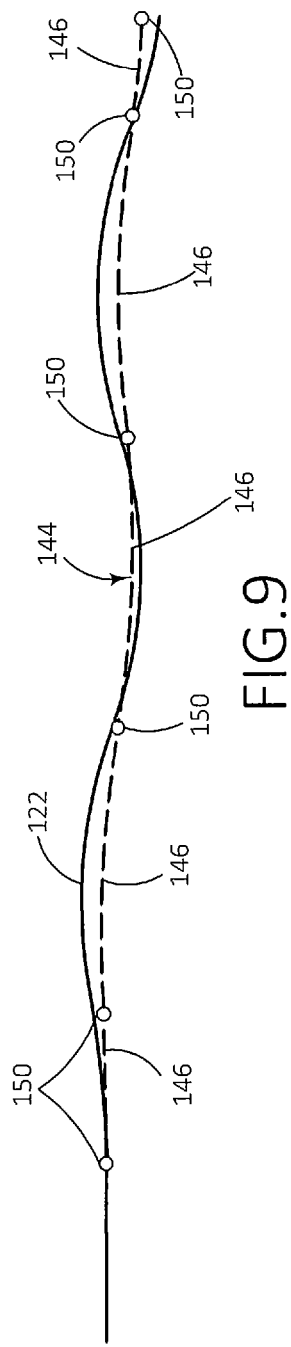
FIG. 9 is a diagrammatic illustration of yet another exemplary cleanup pass profile that may be generated using splines and primitives defined by nodes and curvature inflection points.

In further modifications, nodes 150 may be positioned according to predefined constraints. For example, nodes 150 may be positioned according to a predefined target length for each resulting primitive 146, or according to a predefined target number of primitives 146 per profile. In addition, nodes 150 may be modified, removed or added as necessary, such as to modify or define new primitives 146 and adapt for different types of cut and/or fill profiles as desired. As shown for example in FIG. 7, nodes 150 are positioned on inflection points of an intermediate pass target 144 and relative to an unwanted bump in the work surface 122 that is too large to be removed in a single cut. The nodes 150 aid in defining primitives 146 which segment the pass target 144 into a combination of cut and fill regions to remove the bump in a more efficient manner. In the embodiment of FIG. 8, nodes 150 are similarly positioned on inflections points of a pass target 144 to generate primitives 146 which form an S-shaped loading curve. Furthermore, in the embodiment of FIG. 9, nodes 150 are positioned at inflection points of a pass target 144 to generate primitives 146 which form a snake-shaped cut, or a cut that snakes through multiple bumps and valleys in the work surface 122.

Still further, the cleanup pass profile module 138 of FIG. 3 may configure the controller 126 to adjoin or spline the primitives 146 generated by the primitive generation module 136 and form the cleanup pass profile 148 for the given work surface 122 and pass target 144. More specifically, controller 126 may be configured to generate one or more mathematical relationships that interrelate the polynomial or other curve functions associated with the individual primitives 146 in a manner which adjoins the endpoints of the primitive curves 146 or interconnects previously defined nodes 150. Additionally, the cleanup pass profile 148 may be one of multiple groups of primitives 146 generated for a given cut profile. For example, the cut profile may be composed of multiple regions including, for example, the loading region, the carry region, the design elevation, the pass target 144 or any intermediary pass targets, and the like, and each group of primitives 146 may correspond to one or more of the different regions within the given cut profile. The controller 126 may further digitalize or otherwise translate functions pertaining to the resulting cleanup pass profile 148 into the appropriate instructions for execution by one or more of the machines 102 and/or implements 104 within the worksite 100. In particular, the instructions corresponding to the cleanup pass profile 148 may be transmitted by the communications device 130 to the appropriate machines 102 or implements 104, which may in turn, execute the cleanup pass accordingly. Other variations and modifications to the algorithms or methods will be apparent to those of ordinary skill in the art. One exemplary algorithm or method by which the controller 126 may be operated to determine a grade control or cleanup pass profile 148 using splines is discussed in more detail below.

INDUSTRIAL APPLICABILITY

In general, the present disclosure sets forth methods, devices and systems for spline-based planning and execution of grade control or cleanup passes where there are motivations to improve productivity and efficiency. Although applicable to any type of machine, the present disclosure may be particularly applicable to autonomously or semi-autonomously controlled dozing machines where the dozing machines are controlled along particular travel routes within a worksite to excavate materials. Moreover, the present disclosure may improve the overall excavation process by enabling more versatile and more precise grade control or cleanup passes. Furthermore, by providing for more versatile cleanup pass profiles that can be autonomously or semi-autonomously executed, unwanted irregularities in a given work surface may be efficiently corrected and deviations typically caused thereby may be significantly reduced.

Figure 10:
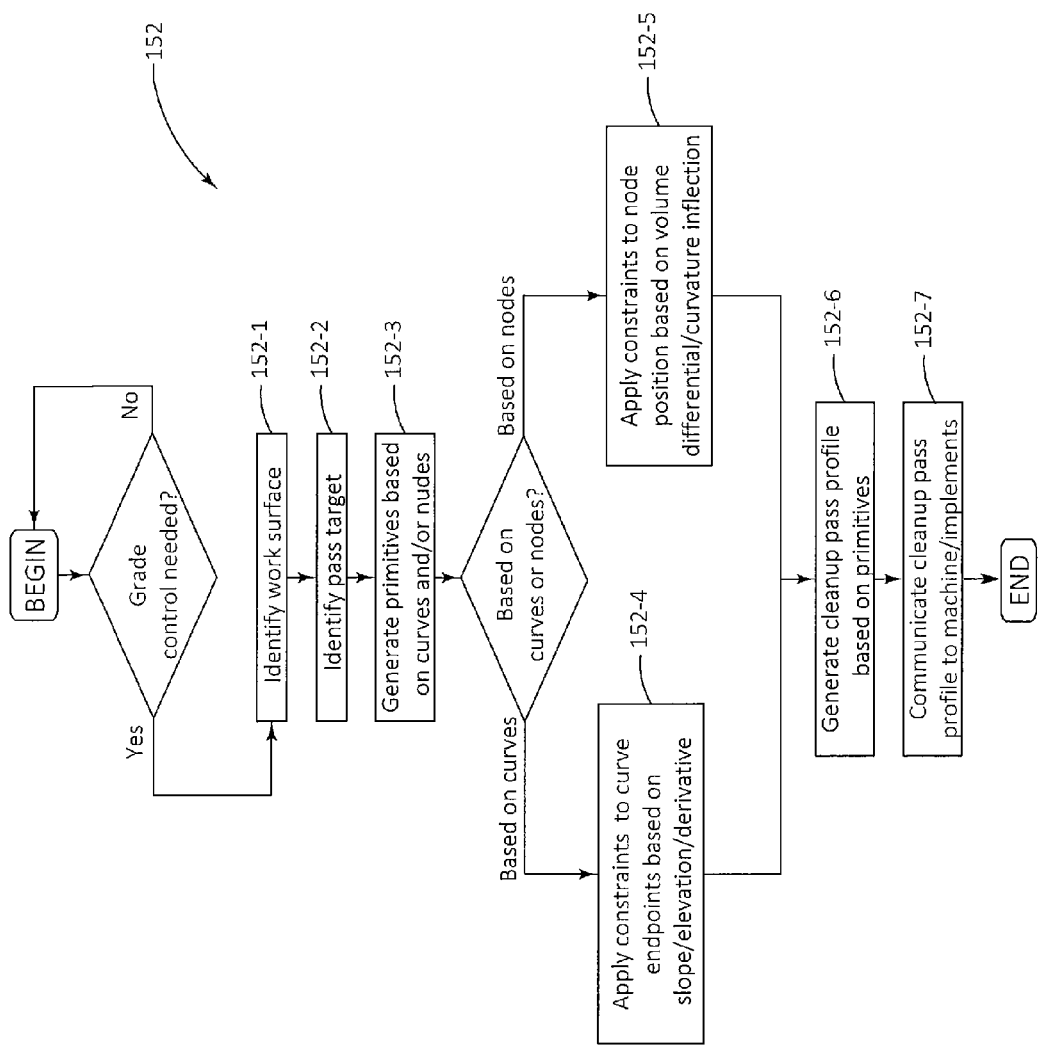
FIG. 10 is a flowchart depicting an exemplary disclosed method that may be performed by a control system of the present disclosure.

Turning now to FIG. 10, one exemplary algorithm or computer-implemented method 152 for determining a cleanup pass profile 148 is diagrammatically provided, according to which, for example, the control system 108 and the controller 126 may be configured to operate. As shown, the controller 126 may initially determine whether a grade control or cleanup pass is needed, such as by manual or autonomous means. For instance, a cleanup pass may be manually triggered in response to operator input remotely or locally entered via any one or more of the machines 102, command centers 118, computing devices 120, and the like. Alternatively, a cleanup pass may be autonomously triggered, for example, at predefined intervals of time and/or at predefined checkpoints pertaining to the geographical state of work surface 122. Predefined checkpoints may be defined based on any combination of the length of the given pass, the relative elevations of the alignment gap 140 and the crest 142, the slope, the volume of material moved, removed or remaining, and the like. In further alternatives, the control system 108 and the controller 126 may be configured to autonomously assess whether a cleanup pass is appropriate, for instance, based on any deviations in the tracked progress, position and/or orientation of the work machines 102 and implements 104.

If no trigger or request for a cleanup pass is detected, the controller 126 may continue monitoring for such triggers while resuming normal cut operations. If a valid request for a cleanup pass is determined, the controller 126 may begin planning a cleanup pass profile 148 that is most appropriate for the given work surface 122 and pass target 144 according to the algorithm or method 152 shown in FIG. 10. According to block 152-1 for example, the controller 126 may be configured to initially identify the work surface 122, such as in terms of position relative to the worksite 100, position relative to the machines 102, elevation, slope, volume of material moved, removed or remaining, terrain composition, or any other relevant geographical profile thereof. For a work surface 122 provided along a slot 124, as shown for instance in FIGS. 1 and 4, the controller 126 may additionally identify the locations of the alignment gap 140 and the crest 142. Moreover, the controller 126 may be configured to receive profile information relating to the work surface 122 and/or changes thereto via manual user input, preprogrammed input, periodically updated input, real-time input, or combinations thereof.

Once information regarding the work surface 122 has been sufficiently identified, mapped or otherwise obtained, the controller 126 may further identify the pass target 144 according to block 152-2 of FIG. 10. Specifically, the controller 126 may be configured to identify the pass target 144 in terms of position relative to the worksite 100, position relative to the machines 102, position relative to the work surface 122, elevation, slope, volume differential with the work surface 122, terrain composition, or any other relevant geographical profile. In general, the pass target 144 may extend the length of the work surface 122 between the alignment gap 140 and the crest 142. While the pass target 144 may be identified using any number of different techniques, the controller 126 may identify or define the pass target 144 based on a two-dimensional curve that is positioned, superimposed or otherwise mapped relative to the work surface 122, as shown for example in FIG. 4. Information regarding the pass target 144 may be manually input, programmed or preprogrammed into the controller 126, or alternatively, identified based on a two-dimensional cross-section or slice of a three-dimensional model of the pass target 144. In other alternatives, the controller 126 may be configured to identify the work surface 122 and the pass target 144 using three-dimensional models.

Having identified each of the given work surface 122 and the desired pass target 144, the controller 126 may be configured to generate a plurality of primitive curves, or primitives 146, according to block 152-3 of FIG. 10. The controller 126 may generate the primitives 146 based on curves that can be later adjoined to construct a spline-based cleanup pass profile 148, as shown for example in FIG. 4. More specifically, the controller 126 may define each primitive 146 as a line, a parabola, a cubic, a polynomial, a Gaussian curve, an exponential function, or any other primitive structure that can approximate the desired cleanup pass profile 148. Alternatively, the controller 126 may define the primitives 146 based on nodes 150 strategically positioned to define interconnecting curves which ultimately form the cleanup pass profile 148, as shown for example in FIGS. 5 and 6. Furthermore, one or more curves may be modified, removed or added to any series of primitives 146 previously defined based on nodes 150, and conversely, any one or more nodes 150 may be modified, removed or added to any series of primitives 146 previously defined based on curves.

If the controller 126 is configured to generate the primitives 146 based on curves, the controller 126 in block 152-4 may additionally apply constraints on each primitive 146 to further define the curves thereof as well as provide for a substantially smooth and continuous cleanup pass profile 148. For example, the controller 126 may constrain the elevation, the slope and/or any other derivative at each endpoint of each primitive 146 to those of an endpoint of an adjoining primitive 146, or to those of a corresponding segment of the work surface 122 or pass target 144. If the controller 126 is configured to generate the primitives 146 based on nodes 150, the controller 126 in block 152-5 may also apply constraints on the position of the nodes 150. For example, the controller 126 may be constrained to position the nodes 150 at points of intersection between the work surface 122 and the pass target 144 so as to segment or define primitives 146 based on volume differentials between the work surface 122 and the pass target 144. In another example, the controller 126 may be constrained to position the nodes 150 on curvature inflection points of the work surface 122 so as to segment or define primitives 146 based on changes in the concavity of the work surface 122. Furthermore, the controller 126 may be configured to enable modification of any of the constraints placed on the primitive curves, endpoints and/or nodes 150. In some applications, for example, the final elevation, or the elevation of the node 150 or curve endpoint nearest the crest 142 of a given work surface 122, may be left unconstrained or floating.

Once all appropriate constraints have been applied and once all primitives 146 have been generated, the controller 126 may be configured to adjoin or spline the primitives 146 so as to form the cleanup pass profile 148 for the given work surface 122 and pass target 144 in accordance with block 152-6 of FIG. 10. More specifically, the controller 126 may generate one or more mathematical relationships that interrelate the polynomial or curve functions associated with the individual primitives 146 in a manner which adjoins the endpoints of the primitive curves 146 or interconnects previously defined nodes 150. Additionally, the cleanup pass profile 148 may be one of multiple groups of primitives 146 generated for a given cut profile having multiple regions such as the loading region, the carry region, the design elevation, the pass target 144 or any intermediary pass targets, and the like. In such an embodiment, the controller 126 may be configured to generate different groups of primitives 146 such that each group of primitives 146 corresponds to one or more of the different regions within the given cut profile. The controller 126 may further digitalize or otherwise translate the resulting cleanup pass profile 148 into the appropriate instructions for execution by one or more of the machines 102 or implements 104 within the worksite 100. Additionally, the controller 126 may communicate instructions corresponding to the final cleanup pass profile 148, such as via the communications device 130, to the appropriate machines 102 and machine implements 104, according to block 152-7 of FIG. 10. Machines 102 or implements 104 receiving such instructions may then autonomously or semi-autonomously operate to execute the cleanup pass according to the cleanup pass profile 148 generated by the controller 126 in block 152-6.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A computer-implemented method for performing an autonomous grade control pass by a machine, comprising:
   determining, by a locating device included on the machine, one of a position and orientation of the machine relative to a work surface;
   determining, by an implement sensor located on the machine, one of a position and orientation of an implement pivotally attached to the machine;
   receiving, by a controller, one of the position and orientation of the machine relative to the work surface and one of the position and orientation of the implement pivotally attached to the machine;
   identifying, by the controller, a pass target extending from a first end to a second end along the work surface;
   generating, by the controller, a plurality of primitives between the first end and the second end, each primitive having endpoints configured to approximate at least one of the pass target, the work surface, and an endpoint of an adjoining primitive;
   adjoining, by the controller, the primitives at the endpoints to form a substantially continuous cleanup pass profile and;
   adjusting, by the controller, the implement height relative to the worksite based on the cleanup pass profile.

2. The computer-implemented method of claim 1, wherein the first end of the pass target corresponds to an alignment gap and the second end of the pass target corresponds to a crest, the primitive at the first end sharing at least a common slope and a common elevation with one of the work surface and the pass target, and the primitive at the second end sharing at least a common slope and a common elevation with the crest.

3. The computer-implemented method of claim 1, wherein the first end of the pass target corresponds to an alignment gap and the second end of the pass target corresponds to a crest, the primitive at the first end sharing at least a common slope and a common elevation with one of the work surface and the pass target, and the primitive at the second end sharing a common slope with the crest but having a floating elevation relative thereto.

4. The computer-implemented method of claim 1, wherein the endpoints of each primitive are configured to approximate at least one of the pass target, the work surface, and another endpoint in at least slope and elevation.

5. The computer-implemented method of claim 1, wherein the cleanup pass profile is defined by a spline of two or more primitives, each primitive corresponding to at least one of a polynomial, a line, a parabola, a cubic, an exponential function, and a Gaussian curve.

6. The computer-implemented method of claim 1, wherein the cleanup pass profile is defined by a spline of two or more primitives, each primitive being defined by one or more nodes positioned along the pass target between the first end and the second end, at least one of a length of each primitive and a number of primitives being predefined.

7. The computer-implemented method of claim 1, wherein the cleanup pass profile is defined by a spline of two or more primitives, each primitive being defined by one or more nodes positioned along the pass target between the first end and the second end, the nodes being configured to segment the pass target into primitives according to one or more of volume differentials in the work surface in relation to the pass target and curvature inflection points in the work surface.

8. The computer-implemented method of claim 1, wherein the cleanup pass profile is one of multiple groups of primitives generated for a given cut profile with multiple regions, each region being associated with at least one group of primitives and corresponding to one of a loading region, a carry region, a design elevation, the pass target and any intermediary pass targets.

9. The computer-implemented method of claim 1, wherein the primitives are configured to form cleanup pass profiles compatible for use with one or more of negative volume regions, shave cuts, and snake cuts for multiple cut and fill regions.

10. A control system for performing an autonomous grade control pass by a machine, comprising:
    a locating device included on the machine, configured to provide one of a position and orientation of the machine relative to a work surface;
    an implement sensor located on the machine configured to provide one of a position and orientation of an implement pivotally attached to the machine;
    a memory configured to retrievably store one or more algorithms; and
    a controller in communication with the memory and, based on the one or more algorithms, configured to at least:
    receive one of the position and orientation of the machine relative to the work surface and one of the position and orientation of the implement pivotally attached to the machine;
    identify a pass target extending from a first end to a second end along a work surface,
    generate a plurality of primitives between the first end and the second end such that each primitive has endpoints configured to approximate at least one of the pass target, the work surface, and an endpoint of an adjoining primitive,
    adjoin the primitives at the endpoints to form a substantially continuous cleanup pass profile and;
    adjust the implement height relative to the worksite based on the cleanup pass profile.

11. The control system of claim 10, wherein the controller configures the endpoints of each primitive to approximate at least one of the pass target, the work surface, and another endpoint in at least slope and elevation.

12. The control system of claim 10, wherein the controller defines the cleanup pass profile based on a spline of two or more primitives, each primitive corresponding to at least one of a polynomial, a line, a parabola, a cubic, an exponential function, and a Gaussian curve.

13. The control system of claim 10, wherein the controller defines the cleanup pass profile based on a spline of two or more primitives, each primitive being defined by one or more nodes positioned along the pass target between the first end and the second end, at least one of a length of each primitive and a number of primitives being predefined.

14. The control system of claim 10, wherein the controller defines the cleanup pass profile based on a spline of two or more primitives, each primitive being defined by one or more nodes positioned along the pass target between the first end and the second end, the nodes being configured to segment the pass target into primitives according to one or more of volume differentials in the work surface in relation to the pass target and curvature inflection points in the work surface.

15. The control system of claim 10, wherein the cleanup pass profile is one of multiple groups of primitives generated for a given cut profile with multiple regions, each region being associated with at least one group of primitives and corresponding to one of a loading region, a carry region, a design elevation, the pass target and any intermediary pass targets.

16. A machine having a control system for performing an autonomous grade control pass, comprising:
   a locating device configured to provide one of a position and orientation of the machine relative to a work surface;
   an implement sensor configured to provide one of a position and orientation of an implement pivotally attached to the machine;
   a controller configured to:
      receive one of the position and orientation of the machine relative to the work surface and one of the position and orientation of the implement pivotally attached to the machine;
      identify a pass target extending from a first end to a second end along a work surface,
      generate a plurality of primitives between the first end and the second end such that each primitive has endpoints configured to approximate at least one of the pass target, the work surface, and an endpoint of an adjoining primitive,
      adjoin the primitives at the endpoints to form a substantially continuous cleanup pass profile, and;
      adjust the implement height relative to the worksite based on the cleanup pass profile.

17. The machine of claim 16, wherein the controller configures the endpoints of each primitive to approximate at least one of the pass target, the work surface, and another endpoint in at least slope and elevation.

18. The machine of claim 16, wherein the controller defines the cleanup pass profile based on a spline of two or more primitives, each primitive corresponding to at least one of a polynomial, a line, a parabola, a cubic, an exponential function, and a Gaussian curve.

19. The machine of claim 16, wherein the controller defines the cleanup pass profile based on a spline of two or more primitives, each primitive being defined by one or more nodes positioned along the pass target between the first end and the second end, at least one of a length of each primitive and a number of primitives being predefined.

20. The machine of claim 16, wherein the controller defines the cleanup pass profile based on a spline of two or more primitives, each primitive being defined by one or more nodes positioned along the pass target between the first end and the second end, the nodes being configured to segment the pass target into primitives according to one or more of volume differentials in the work surface in relation to the pass target and curvature inflection points in the work surface.

* * * * *